United States Patent
Liang et al.

(10) Patent No.: US 12,108,301 B2
(45) Date of Patent: Oct. 1, 2024

(54) MOBILITY STATE ESTIMATION METHOD AND TERMINAL DEVICE

(71) Applicant: VIVO MOBILE COMMUNICATION CO.,LTD., Guangdong (CN)

(72) Inventors: Jing Liang, Guangdong (CN); Wei Bao, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 511 days.

(21) Appl. No.: 17/559,175

(22) Filed: Dec. 22, 2021

(65) Prior Publication Data
US 2022/0116846 A1    Apr. 14, 2022

Related U.S. Application Data

(63) Continuation of application No. PCT/CN2020/097655, filed on Jun. 23, 2020.

(30) Foreign Application Priority Data

Jun. 27, 2019   (CN) .......................... 201910568054.0

(51) Int. Cl.
H04W 4/00       (2018.01)
H04W 36/08      (2009.01)
H04W 36/32      (2009.01)

(52) U.S. Cl.
CPC ........... *H04W 36/32* (2013.01); *H04W 36/08* (2013.01)

(58) Field of Classification Search
CPC ................. H04W 36/32; H04W 36/08; H04W 36/324; H04W 36/00837; H04W 8/02; H04W 24/02

(Continued)

(56) References Cited

U.S. PATENT DOCUMENTS 10,750,393 B2 *  8/2020  Engström ........... H04W 72/046
2014/0220973 A1 * 8/2014  Lunden ............... H04W 36/324
                                                          455/436

(Continued)

FOREIGN PATENT DOCUMENTS

CN         101459988 A    6/2009
CN         102474777 A    5/2012

(Continued)

OTHER PUBLICATIONS

Catt, "Cell Re-selection in HSDN Station", 3GPP TSG-RAN WG2 Meeting #103, R2-1811376, Gothenburg, Sweden, Aug. 20-24, 2018.

(Continued)

*Primary Examiner* — Amancio Gonzalez
(74) *Attorney, Agent, or Firm* — Price Heneveld LLP (57) ABSTRACT

A mobility state estimation method and a terminal device are provided. The method includes: in an MSE process, performing MSE in a target manner if a cell used to calculate cell reselection times in a first estimation period includes M private network cells; and the target manner includes one of the following manners: excluding N private network cells in the M private network cells from the MSE process; performing the MSE based on a cell in a second estimation period; and determining first target cell reselection times as final cell reselection times used for the MSE, where the first target cell reselection times are greater than first initial cell reselection times, and the first initial cell reselection times are obtained through calculation based on the cell used to calculate the cell reselection times.

20 Claims, 2 Drawing Sheets

---

Exclude, in a mobility state estimation MSE process, a private network cell reselected in an estimation period from the MSE process, where a start moment of the estimation period is a start moment of the MSE process    ~ S210

(58) Field of Classification Search
USPC .......................................................... 370/331
See application file for complete search history.

(56) References Cited

U.S. PATENT DOCUMENTS

| | | | |
|---|---|---|---|
| 2016/0360537 A1 | 12/2016 | Palenius et al. | |
| 2019/0387440 A1* | 12/2019 | Yiu | H04W 36/362 |
| 2020/0389831 A1* | 12/2020 | Mackenzie | H04W 36/324 |
| 2023/0090971 A1* | 3/2023 | Yiu | H04W 36/32 |
| | | | 370/331 |

FOREIGN PATENT DOCUMENTS

| | | |
|---|---|---|
| CN | 102904603 A | 1/2013 |
| CN | 106454715 A | 2/2017 |
| CN | 106817733 A | 6/2017 |
| CN | 106878946 A | 6/2017 |
| CN | 109792625 A | 5/2019 |
| CN | 109936862 A | 6/2019 |
| EP | 3277025 A1 | 1/2018 |
| KR | 20110011554 A | 2/2011 |
| WO | 2014108823 A2 | 7/2014 |

OTHER PUBLICATIONS

Nokia, "Improved Mobility State Estimation", 3GPP TSG-RAN WG2 Meeting #77bis, R2-121624, Jeju, South Korea, Mar. 26-30, 2012.

LG Electronics Inc., "Unnecessary Mobility State change in CSG or Hybrid Cells", 3GPP TSG-RAN WG2 #68, R2-096941, Jeju, Korea, Nov. 9-13, 2009.

Catt, "Cell Re-selection in HSDN Station", 3GPP TSG-RAN WG2 Meeting #101bis, R2-1804570, Sanya, China, Apr. 16-20, 2018.

LG Electronics Inc., "Discussion on the issue of MSE for HSDN capable UE", 3GPP TSG-RAN WG2#101bis, R2-1805774. Sanya, China, Apr. 16-20, 2018.

* cited by examiner

In a mobility state estimation MSE process, perform MSE in a target manner if a cell used to calculate cell reselection times in a first estimation period includes M private network cells, where M is a positive integer; and target manner includes one of the following manners: excluding N private network cells in the M private network cells from the MSE process, where N is a positive integer less than or equal to M; performing the MSE based on a cell in a second estimation period, where duration of the second estimation period is greater than duration of the first estimation period; and determining first target cell reselection times as final cell reselection times used for the MSE, where the first target cell reselection times are greater than first initial cell reselection times, and the first initial cell reselection times are obtained by the terminal device through calculation based on the cell used to calculate the cell reselection times ⎯ S110

FIG. 1

Exclude, in a mobility state estimation MSE process, a private network cell reselected in an estimation period from the MSE process, where a start moment of the estimation period is a start moment of the MSE process ⎯ S210

FIG. 2

Terminal device 30

Processing module 31

FIG. 3

Terminal device 40

Processing module 41

MOBILITY STATE ESTIMATION METHOD AND TERMINAL DEVICE

CROSS-REFERENCE TO RELATED APPLICATIONS

This application is a continuation application of International Application No. PCT/CN2020/097655 filed on Jun. 23, 2020, which claims priority to Chinese Patent Application No. 201910568054.0, entitled "MOBILITY STATE ESTIMATION METHOD AND TERMINAL DEVICE", filed on Jun. 27, 2019, which is incorporated herein by reference in their entireties.

TECHNICAL FIELD

This application relates to the field of communications technologies, and in particular, to a mobility state estimation method and a terminal device.

BACKGROUND

To better serve a terminal device on a high-speed railway, an operator optimizes parameters of cells along the high-speed railway to form a high-speed railway private network to adapt to an application scenario of high-speed moving. In addition, there are many terminal devices moving in a low speed around the high-speed railway. To serve these terminal devices moving in a low speed, the operator configures, for a network, a network parameter applicable to a low-speed scenario, that is, coverage of a public network. Coverage of the public network overlaps that of the private network in some areas, that is, in some districts, both the coverage of the public network and the coverage of the private network exist.

The terminal device may determine a moving speed of the terminal device based on cell reselection times in a period of time. If the cell reselection times of the terminal device are less than a preset threshold A in a period of time, the terminal device is in a low-speed state. If the cell reselection times are greater than or equal to the preset threshold A and less than or equal to a preset threshold B in a period of time, the terminal device is in a medium-speed state. If the cell reselection times are greater than the preset threshold B in a period of time, the terminal device is in a high-speed state. The terminal device that is determined to be in a high-speed state preferentially camps on the private network, and another terminal device preferentially camps on the public network.

When a train decelerates and finally stops at a station, a terminal device on the train estimates whether the terminal device is in a medium-speed state or a low-speed state, to choose to camp on the public network. After the train starts, the terminal device on the train estimates that the terminal device is in a high-speed state, to choose to camp on the private network. In this process, the terminal device does not get off the train, and a camping network selection process is unnecessary, thereby resulting in unnecessary power consumption to the terminal device and increasing a possibility of network congestion.

SUMMARY

Embodiments of this application are intended to provide a mobility state estimation method and a terminal device.

To resolve the foregoing problem, the embodiments of this application are implemented as follows:

According to a first aspect, a mobility state estimation method is provided, and the method includes:
in a mobility state estimation MSE process, performing MSE in a target manner if a cell used to calculate cell reselection times in a first estimation period includes M private network cells, where M is a positive integer; and
the target manner includes one of the following manners:
excluding N private network cells in the M private network cells from the MSE process, where N is a positive integer less than or equal to M;
performing the MSE based on a cell in a second estimation period, where duration of the second estimation period is greater than duration of the first estimation period; and
determining first target cell reselection times as final cell reselection times used for the MSE, where the first target cell reselection times are greater than first initial cell reselection times, and the first initial cell reselection times are obtained by the terminal device through calculation based on the cell used to calculate the cell reselection times.

According to a second aspect, a mobility state estimation method is provided, and the method includes:
excluding, in a mobility state estimation MSE process, a private network cell reselected in an estimation period from the MSE process, where a start moment of the estimation period is a start moment of the MSE process.

According to a third aspect, a terminal device is provided, and the terminal device includes:
a processing module, configured to: in a mobility state estimation MSE process, perform MSE in a target manner if a cell used to calculate cell reselection times in a first estimation period includes M private network cells, where M is a positive integer; and
the target manner includes one of the following manners:
excluding N private network cells in the M private network cells from the MSE process, where N is a positive integer less than or equal to M;
performing the MSE based on a cell in a second estimation period, where duration of the second estimation period is greater than duration of the first estimation period; and
determining first target cell reselection times as final cell reselection times used for the MSE, where the first target cell reselection times are greater than first initial cell reselection times, and the first initial cell reselection times are obtained by the terminal device through calculation based on the cell used to calculate the cell reselection times.

According to a fourth aspect, a terminal device is provided, and the terminal device includes:
a processing module, configured to exclude, in a mobility state estimation MSE process, a private network cell reselected in an estimation period from the MSE process, where a start moment of the estimation period is a start moment of the MSE process.

According to a fifth aspect, a terminal device is provided, including a processor, a memory, and a computer program that is stored in the memory and that can be run by the processor, where when the computer program is executed by the processor, the steps of the method in the first aspect or the second aspect are implemented.

According to a sixth aspect, a computer-readable storage medium is provided. The computer-readable storage medium stores a computer program, and when the computer program is executed by a processor, the steps of the method in the first aspect or the second aspect are implemented.

BRIEF DESCRIPTION OF DRAWINGS

The following describes features, advantages, and technical effects of the exemplary embodiments of this application with reference to the accompanying drawings.

DESCRIPTION OF EMBODIMENTS

The following further describes implementations of this application in detail with reference to the accompanying drawings and the embodiments. Detailed descriptions and accompanying drawings in the following embodiments are used to illustrate the principles of this application by way of example, but are not intended to limit the scope of this application, that is, this application is not limited to the described embodiments.

The technical solutions of this application may be applied to various communications systems, such as a Global System for Mobile Communications (GSM), a Code Division Multiple Access (CDMA) system, a Wideband Code Division Multiple Access (WCDMA) system, a general packet radio service (GPRS) system, a Long Term Evolution (LTE)/Long Term Evolution-advanced (LTE-A) system, a mew radio (NR) system, and a subsequent evolved communications system.

A terminal device (UE) in the embodiments of this application, also referred to as a mobile terminal, a mobile user device, or the like, may communicate with one or more core networks through a radio access network (for example, RAN). User equipment may be a mobile terminal, such as a mobile phone (or referred to as a "cellular" phone) and a computer with a mobile terminal. For example, the user equipment may be a portable, pocket-sized, handheld, computer built-in, or in-vehicle mobile apparatus, which exchanges language and/or data with the radio access network.

A network device in the embodiments of this application is an apparatus deployed in a radio access network device to provide a wireless communication function for the terminal device. The network device may be, for example, a base station. The base station may be an evolved NodeB (eNB or e-NodeB) in LTE and a 5th generation mobile network (5G) base station (gNB), or a network end device of a subsequent evolved version. This is not limited in this application.

The following describes in detail the technical solutions provided in the embodiments of this application with reference to the accompanying drawings.

It should be noted that in the embodiments of this application, a mobility state estimation (MSE) process may have a time relationship with a cell reselection process. For example, MSE is performed before the cell reselection process is initiated, or MSE is performed when cell reselection is initiated, or MSE is performed at a time point after the cell reselection process is initiated. The mobility state estimation may also be referred to as mobility state detection (MSD).

In the embodiments of this application, the MSE process may not be related to the cell reselection process, that is, the two processes are independent of each other. In this case, the cell reselection process directly uses a result of the MSE process.

In the embodiments of this application, the MSE process may occur after the terminal device reads a system message, and broadcasts one or more parameters related to a mobility state in the system message. Alternatively, a time point at which the MSE process occurs depends on specific implementation of the terminal device.

Figure 1:
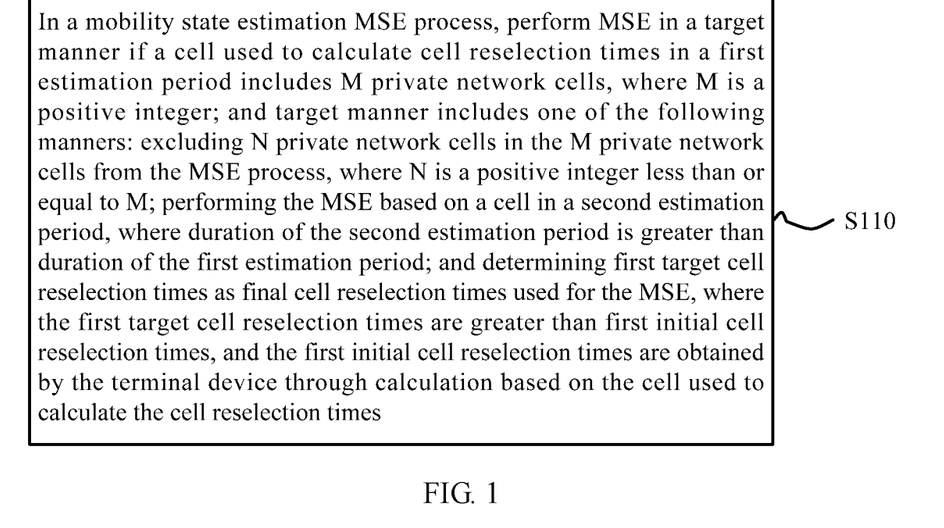
FIG. 1 is a schematic flowchart of mobility state estimation according to an embodiment of this application.

FIG. 1 shows a mobility state estimation method according to an embodiment of this application. As shown in FIG. 1, the method includes the following steps.

S110. In a mobility state estimation MSE process, perform MSE in a target manner if a cell used to calculate cell reselection times in a first estimation period includes M private network cells, where M is a positive integer.

The target manner includes one of the following manners:
excluding N private network cells in the M private network cells from the MSE process, where N is a positive integer less than or equal to M;
performing the MSE based on a cell in a second estimation period, where duration of the second estimation period is greater than duration of the first estimation period; and
determining first target cell reselection times as final cell reselection times used for the MSE, where the first target cell reselection times are greater than first initial cell reselection times, and the first initial cell reselection times are obtained by the terminal device through calculation based on the cell used to calculate the cell reselection times.

The cell used to calculate the cell reselection times in S110 may include a cell on which the terminal device currently camps, or may not include a cell on which the terminal device currently camps.

It can be understood that in S110, in a case that the cell used by the terminal device to calculate the cell reselection times in the first estimation period includes the M private network cells, the terminal device directly performs the MSE in the target manner in the MSE process, or after the terminal device performs the MSE based on the cell used to calculate the cell reselection times in the first estimation period, the terminal device performs the MSE in the target manner.

It should be noted that the final cell reselection times in S110 may be understood as cell reselection times used to finally estimate a mobility state (or a speed state) of the terminal device and obtain an estimation result.

Optionally, in some embodiments, the terminal device performs the MSE in the target manner after the first initial cell reselection times are obtained through calculation based on the cell used to calculate the cell reselection times.

Further, if it is determined, based on the first initial cell reselection times, that a speed of the terminal device decreases, the MSE is performed in the target manner after the first initial cell reselection times are obtained through calculation based on the cell used to calculate the cell reselection times.

In other words, after determining that an estimation speed decreases through one MSE process, the terminal device performs an MSE process again. In this MSE process, the MSE is performed in the target manner.

The terminal device may determine that the estimation speed decreases in the following two manners:

Manner 1: If it is determined, based on the first initial cell reselection times, that the terminal device is in a medium-speed state or a low-speed state, or the first initial cell reselection times are less than a target threshold; and the terminal device is in a high-speed state before the first initial cell reselection times are obtained through calculation, it is determined that the speed of the terminal device decreases.

Manner 2: If the first initial cell reselection times are less than second target cell reselection times, it is determined that the speed of the terminal device decreases. The second target cell reselection times are used to estimate a mobility state of the terminal device in a last MSE process before the first initial cell reselection times are obtained.

In other words, if an estimation result of a previous mobility state estimation process is a high-speed state, and an estimation result of a current mobility state estimation process is a medium-speed or a low-speed state, or cell reselection times calculated this time are less than the target threshold, it is considered that the speed of the terminal device decreases. Alternatively, if cell reselection times obtained through calculation in a previous mobility state estimation process is X, and cell reselection times obtained through calculation in a current mobility state estimation process are less than X, it is considered that the speed of the terminal device decreases. In addition, if the estimation result of the previous mobility state estimation process is a medium-speed state, and the estimation result of the current mobility state estimation process is a low-speed state, it may also be considered that the speed of the terminal device decreases.

The target threshold herein may be a value specified in a protocol, or may be a value configured by a network device.

Optionally, in an example, the excluding N private network cells in the M private network cells from the MSE process in S110 includes:

determining a third estimation period in a manner in which camping duration of the N private network cells is not counted into estimation duration corresponding to the MSE; and performing the MSE based on a cell in the third estimation period.

For example, if the estimation duration T=30 s when the terminal device performs the MSE, the terminal device needs to count cell reselection times in T (30 s) before a current moment, but a cell in T at the current moment includes the M private network cells. In this case, the terminal device does not count the camping duration of the N private network cells in the M private network cells into the estimation duration. In this case, if a sum of the camping duration of the N private network cells is T1, the terminal device may perform the MSE based on a cell in T+T1 before the current moment.

Specifically, the performing the MSE based on a cell in the third estimation period may be determining cell reselection times obtained through calculation based on the cell in the third estimation period as the final cell reselection times used for the MSE. Alternatively, a difference between cell reselection times obtained through calculation based on the cell in the third estimation period and N is determined as the final cell reselection times used for the MSE.

For example, it is assumed that if the estimation duration T=30 s when the terminal device performs the MSE, the terminal device needs to count cell reselection times in T (30 s) before a current moment, and a cell in T(30 s) before the current moment includes the M private network cells. If a counting result is K times, and it is determined, based on K, that the speed of the terminal device decreases, the terminal device performs the MSE again, and in a process of performing the MSE again, excludes the N private network cells in the M private network cells from the MSE process. In this case, if the sum of the camping duration of the N private network cells is T1, the terminal device counts cell reselection times in T+T1 before the current moment. If a counting result is L, the terminal device uses L-N as the final cell reselection times used for the MSE.

Optionally, in an example, the target manner in S110 includes performing the MSE based on the cell in the second estimation period, and the method shown in FIG. 1 further includes:

determining the second estimation period based on the duration of the first estimation period and a duration offset.

The duration of the second estimation period is a sum of the duration of the first estimation period and the duration offset, and the duration offset is related to at least one of a value of N and camping duration of the N private network cells.

In other words, in a case that the cell used by the terminal device to calculate the cell reselection times in the first estimation period includes the private network cell, the MSE may be directly performed based on a cell in a new estimation period (the second estimation period), or in a case that the first initial cell reselection times are calculated based on the cell used to calculate the cell reselection times in the first estimation period and it is determined, based on the first cell reselection times, that the speed of the terminal device decreases, the MSE is performed based on a cell in a new estimation period. The duration of the second estimation period herein may be determined based on the sum of the duration of the first estimation period and the duration offset, and the duration offset is related to at least one of the value of N and the camping duration of the N private network cells. For example, the duration offset is a sum of the camping duration of the N private network cells.

It can be understood that the duration of the second estimation period may be duration specified in the protocol, or may be duration configured by the network device. A relationship between the duration offset and at least one of the value of N and the camping duration of the N private network cells may be specified in the protocol, or a relationship between the duration offset and at least one of the value of N and the camping duration of the N private network cells may be configured by the network device.

Further, the performing the MSE based on a cell in a second estimation period includes:

obtaining second initial cell reselection times through calculation based on the cell in the second estimation period; and determining a sum of the second initial cell reselection times and a first value offset as the final cell reselection times used for the MSE, where the first value offset is related to at least one of the value of N and the camping duration of the N private network cells.

For example, if the second initial cell reselection times obtained through calculation based on the cell in the second estimation period is K, K+N is used as the final cell reselection times used for the MSE.

A relationship between the first value offset and at least one of the value of N and the camping duration of the N private network cells may be specified in the protocol, or a relationship between the first value offset and at least one of the value of N and the camping duration of the N private network cells may be configured by the network device.

Optionally, in an embodiment, the target manner in S110 includes determining the first target cell reselection times as the final cell reselection times used for the MSE, and the method shown in FIG. 1 further includes:

determining a sum of the first initial cell reselection times and a second value offset as the first target cell reselection times, where the second value offset is related to at least one of a value of N and camping duration of the N private network cells.

In other words, in a case that the cell used by the terminal device to calculate the cell reselection times in the first estimation period includes the private network cell, the first target cell reselection times may be directly determined as the final cell reselection times used for the MSE, or in a case that the first initial cell reselection times are calculated based on the cell used to calculate the cell reselection times in the first estimation period and it is determined, based on the first cell reselection times, that the speed of the terminal device decreases, the first target cell reselection times are determined as the final cell reselection times used for the MSE. The first target cell reselection times herein may be determined based on the sum of the first initial cell reselection times and the second value offset, where the second value offset is related to at least one of the value of N and the camping duration of the N private network cells. For example, the second value offset is N.

It can be understood that the first target cell reselection times may be a value specified in the protocol, or may be a value configured by the network device. A relationship between the second value offset and at least one of the value of N and the camping duration of the N private network cells may be specified in the protocol, or a relationship between the second value offset and at least one of the value of N and the camping duration of the N private network cells may be configured by the network device.

In the method shown in FIG. 1, the terminal device may determine, in the following manner, whether a cell is a private network cell.

Manner 1: The terminal device receives broadcast information of the cell, where the broadcast information includes indication information indicating that the cell is a private network cell; and then determines that the cell is a private network cell.

Manner 2: The terminal device receives broadcast information of the cell, where the broadcast information includes frequency and/or physical cell identifier (PCI) information, and the frequency and/or PCI information matches (for example, the same as) identifier information of one or more neighboring private network cells in broadcast information previously received in another cell; and determines that the cell is a private network cell.

It can be learned from the foregoing detailed descriptions of the method in FIG. 1 that, in the method shown in FIG. 1, the terminal device traces the estimation duration based on the estimation duration, and performs the MSE in the target manner when the cell used to calculate the cell reselection times in the estimation duration includes the private network cell. Therefore, the method in FIG. 1 may be referred to as a "tracing estimation" method.

Figure 2:
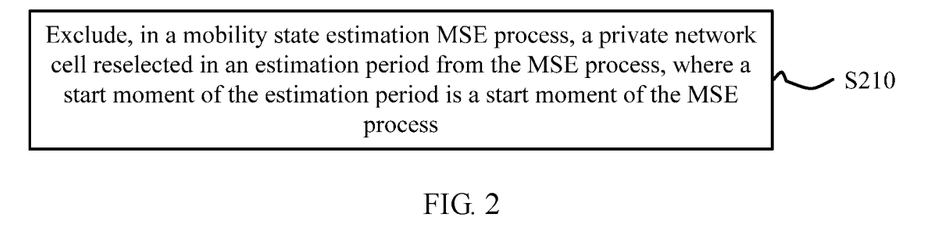
FIG. 2 is a schematic flowchart of mobility state estimation according to another embodiment of this application.

The following describes in detail a mobility state estimation method according to another embodiment of this application with reference to FIG. 2. The method shown in FIG. 2 is performed by a terminal device. As shown in FIG. 2, the method includes the following steps S210. Exclude, in a mobility state estimation MSE process, a private network cell reselected in an estimation period from the MSE process, where a start moment of the estimation period is a start moment of the MSE process.

In the mobility state estimation method in this embodiment of this application, the private network cell reselected in the estimation period is excluded from the MSE process, so that calculated cell reselection times can be increased, thereby avoiding unnecessary power consumption caused by unnecessary camping network selection performed by the terminal device and reducing a possibility of network congestion.

Optionally, in S210, the excluding, in a mobility state estimation MSE process, a private network cell reselected in an estimation period from the MSE process includes: if the terminal device is in a high-speed state and camps on the private network cell, excluding, in the MSE process, the private network cell reselected in the estimation period from the MSE process.

That is, if it is estimated that the terminal device camping on the private network cell is in a high-speed state, in the subsequent MSE process, the terminal device excludes all reselected private network cells from the MSE process.

Optionally, in some embodiments, the excluding a private network cell reselected in an estimation period from the MSE process includes: when cell reselection times in the estimation period is counted, skipping counting the reselected private network cell; and skipping counting camping duration of the reselected private network cell into estimation duration of the estimation period.

For example, assuming that the terminal device in the private network cell is in a high-speed state through a result estimation of a first MSE process, the terminal device starts a second MSE process based on some conditions (for example, the terminal device reads a system message and broadcasts one or more parameters related to a mobility state in the system message), where estimation duration is 30 s. If the private network cell is reselected subsequently, the private network cell is not counted into the cell reselection times, and camping time in the private network cell is not counted into the estimation duration. For example, the estimation duration is 30 s. When the terminal device counts that the cell reselection times is 10 and the estimation duration exceeds 20 s, and the terminal device reselects a private network cell A and camps on the private network cell A for 3 s, the terminal device still considers that the cell reselection times are W and the estimation duration exceeds 20 s. Then, if the terminal device reselects a public network cell B and camps on the public network cell B for 10 s, the terminal device considers that final cell reselection times of the current estimation are 11. That is, it may be considered that estimation duration actually used by the terminal device is 23 s, and the private network cell A is not counted.

In the method shown in FIG. 2, the terminal device may determine, in the following manner, whether a cell is a private network cell.

Manner 1: The terminal device receives broadcast information of the cell, where the broadcast information includes indication information indicating that the cell is a private network cell; and then determines that the cell is a private network cell.

Manner 2: The terminal device receives broadcast information of the cell, where the broadcast information includes frequency and/or physical cell identifier (PCI) information, and the frequency and/or PCI information matches (for example, the same as) identifier information of one or more neighboring private network cells in broadcast information previously received in another cell; and determines that the cell is a private network cell.

The mobility state estimation method according to the embodiments of this application is described above in detail with reference to FIG. 1 to FIG. 2. A terminal device according to the embodiments of this application is described below in detail with reference to FIG. 3.

Figure 3:
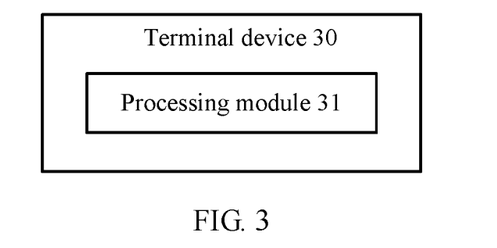
FIG. 3 is a schematic structural diagram of a terminal device according to an embodiment of this application.

FIG. 3 is a schematic structural diagram of a terminal device according to an embodiment of this application. As shown in FIG. 3, a terminal device 30 includes:

a processing module 31, configured to: in a mobility state estimation MSE process, perform MSE in a target manner if a cell used to calculate cell reselection times in a first estimation period includes M private network cells, where M is a positive integer; and the target manner includes one of the following manners:

excluding N private network cells in the M private network cells from the MSE process, where N is a positive integer less than or equal to M;

performing the MSE based on a cell in a second estimation period, where duration of the second estimation period is greater than duration of the first estimation period; and determining first target cell reselection times as final cell reselection times used for the MSE, where the first target cell reselection times are greater than first initial cell reselection times, and the first initial cell reselection times are obtained by the terminal device through calculation based on the cell used to calculate the cell reselection times.

Optionally, in an embodiment, the processing module 31 is specifically configured to:

perform the MSE in the target manner after the first initial cell reselection times are obtained through calculation based on the cell used to calculate the cell reselection times.

Optionally, in an embodiment, the processing module 31 is specifically configured to:

perform the MSE in the target manner if it is determined, based on the first initial cell reselection times, that a speed of the terminal device decreases.

Optionally, in an embodiment, the processing module 31 is further configured to:

if it is determined, based on the first initial cell reselection times, that the terminal device is in a medium-speed state or a low-speed state, or the first initial cell reselection times are less than a target threshold, and the terminal device is in a high-speed state before the first initial cell reselection times are obtained through calculation, determine that the speed of the terminal device decreases.

Optionally, in an embodiment, the processing module 31 is further configured to:

if the first initial cell reselection times are less than second target cell reselection times, determine that the speed of the terminal device decreases, where the second target cell reselection times are used to estimate a mobility state of the terminal device in a last MSE process before the first initial cell reselection times are obtained.

Optionally, in an embodiment, the processing module 31 is specifically configured to:

determine a third estimation period in a manner in which camping duration of the N private network cells is not counted into estimation duration corresponding to the MSE; and perform the MSE based on a cell in the third estimation period.

Optionally, in an embodiment, the processing module 31 is specifically configured to:

determine a difference between cell reselection times obtained through calculation based on the cell in the third estimation period and N as the final cell reselection times used for the MSE.

Optionally, in an embodiment, the target manner includes performing the MSE based on the cell in the second estimation period, and the processing module 31 is further configured to:

determine the second estimation period based on the duration of the first estimation period and a duration offset, where the duration of the second estimation period is a sum of the duration of the first estimation period and the duration offset, and the duration offset is related to at least one of a value of N and camping duration of the N private network cells.

Optionally, in an embodiment, the processing module 31 is specifically configured to:

obtain second initial cell reselection times through calculation based on the cell in the second estimation period; and determine a sum of the second initial cell reselection times and a first value offset as the final cell reselection times used for the MSE, where the first value offset is related to at least one of the value of N and the camping duration of the N private network cells.

Optionally, in an embodiment, the target manner includes determining the first target cell reselection times as the final cell reselection times used for the MSE, and the processing module 31 is further configured to:

determine a sum of the first initial cell reselection times and a second value offset as the first target cell reselection times, where the second value offset is related to at least one of a value of N and camping duration of the N private network cells.

The terminal device 30 provided in this embodiment of this application can implement the processes implemented by the terminal device in the foregoing method embodiment shown in FIG. 1. To avoid repetition, details are not described herein again.

Figure 4:
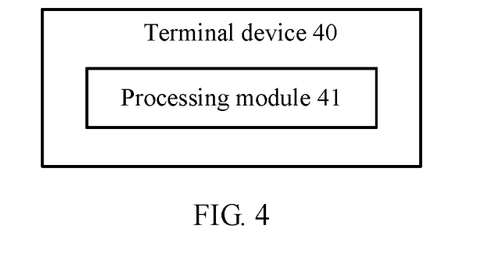
FIG. 4 is a schematic structural diagram of a terminal device according to another embodiment of this application.

FIG. 4 is a schematic structural diagram of a terminal device 40 according to another embodiment of this application. As shown in FIG. 4, the terminal device 40 includes:

a processing module 41, configured to exclude, in a mobility state estimation MSE process, a private network cell reselected in an estimation period from the MSE process, where a start moment of the estimation period is a start moment of the MSE process.

Optionally, in an embodiment, the processing module 41 is specifically configured to:

if the terminal device is in a high-speed state and camps on the private network cell, exclude, in the MSE process, the private network cell reselected in the estimation period from the MSE process.

Optionally, in an embodiment, the processing module 41 is specifically configured to:

when cell reselection times in the estimation period is counted, skip counting the reselected private network cell; and skip counting camping duration of the reselected private network cell into estimation duration of the estimation period.

The terminal device 40 provided in this embodiment of this application can implement the processes implemented by the terminal device in the foregoing method embodiment shown in FIG. 2. To avoid repetition, details are not described herein again.

Figure 5:
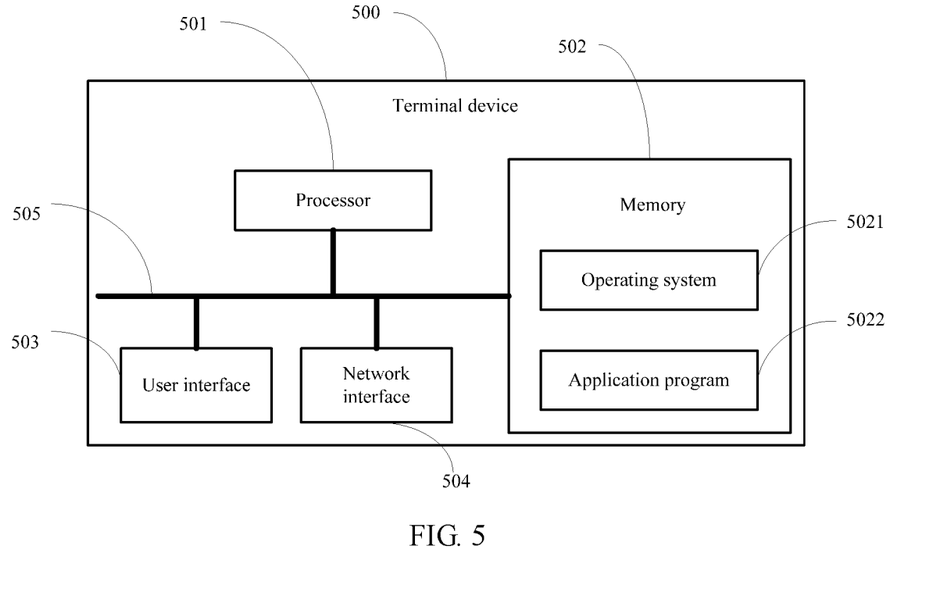
FIG. 5 is a schematic structural diagram of a terminal device according to still another embodiment of this application.

FIG. 5 is a block diagram of a terminal device according to still another embodiment of this application. The user equipment 500 shown in FIG. 5 includes: at least one processor 501, a memory 502, a user interface 503 and at least one network interface 504. Various components of the terminal device 500 are coupled by using the bus system 505. It can be understood that the bus system 505 is configured to implement connection and communication between these components. In addition to a data bus, the bus system 505 may include a power bus, a control bus, and a status signal bus. However, for clarity of description, various buses are marked as the bus system 505 in FIG. 5.

The user interface 503 may include a display, a keyboard, a clicking device (for example, a mouse, a trackball), a touch panel, or a touchscreen.

It can be understood that the memory 502 in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchlink dynamic random access memory (SLDRAM), and a direct rambus random access memory (DRRAM). The memory 502 in the system and the method that are described in the embodiments of this application is to include but is not limited to these memories and a memory of any other proper type.

In some implementation manners, the memory 502 stores the following element, an executable module or a data structure, or a subset thereof, or an extension set thereof: an operating system 5021 and an application program 5022.

The operating system 5021 includes various system programs, such as a framework layer, a core library layer, a driver layer, and the like, and is configured to implement various basic services and process hardware-based tasks. The application program 5022 includes various applications, for example, a media player, and a browser, to implement various application services. A program for implementing the method in the embodiments of this application may be included in the application program 5022.

In the embodiments of this application, the terminal device 500 further includes a computer program that is stored in the memory 502 and can be run by the processor 501. When the computer program is executed by the processor 501, the processes of the foregoing method in FIG. 1 and FIG. 2 are implemented, and a same technical effect can be achieved. To avoid repetition, details are not described herein again.

The methods disclosed in the foregoing embodiments of this application may be applied to the processor 501, or may be implemented by the processor 501. The processor 501 may be an integrated circuit chip having a signal processing capability. During implementation, each step of the foregoing method may be completed by using an integrated logic circuit of hardware in the processor 501 or an instruction in a form of software. The processor 501 may be a general purpose processor, a digital signal processor (DSP), an application specific integrated circuit (ASIC), a field programmable gate array (FPGA), another programmable logic device, a discrete gate, a transistor logic device, or a discrete hardware component. The processor 501 may implement or perform the methods, the steps, and logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished through a hardware decoding processor, or may be executed and accomplished by using a combination of hardware and software modules in the decoding processor. A software module may be located in a mature computer-readable storage medium in the art, such as a random access memory, a flash memory, a read-only memory, a programmable read-only memory, an electrically erasable programmable memory, a register, or the like. The computer-readable storage medium is located in the memory 502, and the processor 501 reads information from the memory 502 and completes the steps of the foregoing method in combination with hardware of the processor 501. Specifically, the computer readable storage medium stores a computer program, and when the computer program is executed by the processor 501, the steps of the method embodiments shown in FIG. 1 to FIG. 2 are implemented.

It can be understood that the embodiments described in the embodiments of this application may be implemented by hardware, software, firmware, middleware, microcode, or a combination thereof. For implementation with hardware, the processing unit can be implemented in one or more application specific integrated circuits (ASIC), a digital signal processor (DSP), a digital signal processing device (DSPD), a programmable logic device (PLD), a field-programmable gate array (PFGA), general processors, controllers, microcontrollers, microprocessors, and another electronic unit for implementing the functions of the present application, or their combinations.

For software implementation, the technology in the embodiments of this application may be implemented through modules (for example, procedures or functions) that perform the functions in the embodiments of this application. Software code may be stored in a memory and executed by a processor. The memory may be implemented in the processor or outside the processor.

An embodiment of this application further provides a computer-readable storage medium. The computer-readable storage medium stores a computer program, and when the computer program is executed by a processor, the processes of the foregoing method embodiments shown in FIG. 1 and FIG. 2 are implemented and a same technical effect can be achieved. To avoid repetition, details are not described herein again. The computer-readable storage medium is, for example, a read-only memory (ROM for short), a random access memory (RAM for short), a magnetic disk, or an optical disc.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

Although this application has been described with reference to the preferred embodiments, various improvements may be made to this application without departing from the scope of this application and parts thereof may be replaced with equivalents. In particular, as long as there is no structural conflict, the various technical features mentioned in the embodiments can be combined in any manner. This application is not limited to the specific embodiments disclosed herein, but includes all technical solutions falling within the scope of the claims.

What is claimed is:

1. A mobility state estimation method, performed by a terminal device and comprising:
    in a mobility state estimation MSE process, performing MSE in a target manner if a cell used to calculate cell reselection times in a first estimation period comprises M private network cells, wherein M is a positive integer; and
    the target manner comprises one of the following manners:
    excluding N private network cells in the M private network cells from the MSE process, wherein N is a positive integer less than or equal to M;
    performing the MSE based on a cell in a second estimation period, wherein duration of the second estimation period is greater than duration of the first estimation period; and
    determining first target cell reselection times as final cell reselection times used for the MSE, wherein the first target cell reselection times are greater than first initial cell reselection times, and the first initial cell reselection times are obtained by the terminal device through calculation based on the cell used to calculate the cell reselection times.

2. The method according to claim 1, wherein the performing MSE in a target manner comprises:
    performing the MSE in the target manner after the first initial cell reselection times are obtained through calculation based on the cell used to calculate the cell reselection times.

3. The method according to claim 2, wherein the performing MSE in a target manner comprises:
    performing the MSE in the target manner if it is determined, based on the first initial cell reselection times, that a speed of the terminal device decreases.

4. The method according to claim 3, wherein the method further comprises:
    if it is determined, based on the first initial cell reselection times, that the terminal device is in a medium-speed state or a low-speed state, or the first initial cell reselection times are less than a target threshold, and the terminal device is in a high-speed state before the first initial cell reselection times are obtained through calculation, determining that the speed of the terminal device decreases.

5. The method according to claim 3, wherein the method further comprises:
    if the first initial cell reselection times are less than second target cell reselection times, determining that the speed of the terminal device decreases, wherein
    the second target cell reselection times are used to estimate a mobility state of the terminal device in a last MSE process before the first initial cell reselection times are obtained.

6. The method according to claim 1, wherein the excluding N private network cells in the M private network cells from the MSE process comprises:
    determining a third estimation period in a manner in which camping duration of the N private network cells is not counted into estimation duration corresponding to the MSE; and
    performing the MSE based on a cell in the third estimation period.

7. The method according to claim 6, wherein the performing the MSE based on a cell in the third estimation period comprises:
    determining a difference between cell reselection times obtained through calculation based on the cell in the third estimation period and N as the final cell reselection times used for the MSE.

8. The method according to claim 1, wherein the target manner comprises performing the MSE based on the cell in the second estimation period, and the method further comprises:
    determining the second estimation period based on the duration of the first estimation period and a duration offset, wherein
    the duration of the second estimation period is a sum of the duration of the first estimation period and the duration offset, and the duration offset is related to at least one of a value of N and camping duration of the N private network cells.

9. The method according to claim 8, wherein the performing the MSE based on a cell in a second estimation period comprises:
    obtaining second initial cell reselection times through calculation based on the cell in the second estimation period; and
    determining a sum of the second initial cell reselection times and a first value offset as the final cell reselection times used for the MSE, wherein the first value offset is related to at least one of the value of N and the camping duration of the N private network cells.

10. The method according to claim 1, wherein the target manner comprises determining the first target cell reselection times as the final cell reselection times used for the MSE, and the method further comprises:
determining a sum of the first initial cell reselection times and a second value offset as the first target cell reselection times, wherein the second value offset is related to at least one of a value of N and camping duration of the N private network cells.

11. A mobility state estimation method, performed by a terminal device and comprising:
excluding, in a mobility state estimation MSE process, a private network cell reselected in an estimation period from the MSE process, wherein a start moment of the estimation period is a start moment of the MSE process.

12. The method according to claim 11, wherein the excluding, in a mobility state estimation MSE process, a private network cell reselected in an estimation period from the MSE process comprises:
if the terminal device is in a high-speed state and camps on the private network cell, excluding, in the MSE process, the private network cell reselected in the estimation period from the MSE process.

13. The method according to claim 11, wherein the excluding a private network cell reselected in an estimation period from the MSE process comprises:
when cell reselection times in the estimation period is counted, skipping counting the reselected private network cell; and
skipping counting camping duration of the reselected private network cell into estimation duration of the estimation period.

14. A terminal device, comprising a memory, a processor, and a computer program that is stored in the memory and that can be run by the processor, wherein when the computer program is executed by the processor, the steps of the mobility state estimation method are implemented, wherein the method comprises:
in a mobility state estimation MSE process, performing MSE in a target manner if a cell used to calculate cell reselection times in a first estimation period comprises M private network cells, wherein M is a positive integer; and
the target manner comprises one of the following manners:
excluding N private network cells in the M private network cells from the MSE process, wherein N is a positive integer less than or equal to M;
performing the MSE based on a cell in a second estimation period, wherein duration of the second estimation period is greater than duration of the first estimation period; and
determining first target cell reselection times as final cell reselection times used for the MSE, wherein the first target cell reselection times are greater than first initial cell reselection times, and the first initial cell reselection times are obtained by the terminal device through calculation based on the cell used to calculate the cell reselection times.

15. The terminal device according to claim 14, wherein the performing MSE in a target manner comprises:
performing the MSE in the target manner after the first initial cell reselection times are obtained through calculation based on the cell used to calculate the cell reselection times.

16. The terminal device according to claim 15, wherein the performing MSE in a target manner comprises:
performing the MSE in the target manner if it is determined, based on the first initial cell reselection times, that a speed of the terminal device decreases.

17. The terminal device according to claim 16, wherein when the program is executed by the processor, the processor further implements,
if it is determined, based on the first initial cell reselection times, that the terminal device is in a medium-speed state or a low-speed state, or the first initial cell reselection times are less than a target threshold, and the terminal device is in a high-speed state before the first initial cell reselection times are obtained through calculation, determining that the speed of the terminal device decreases.

18. The terminal device according to claim 16, wherein when the program is executed by the processor, the processor further implements,
if the first initial cell reselection times are less than second target cell reselection times, determining that the speed of the terminal device decreases, wherein
the second target cell reselection times are used to estimate a mobility state of the terminal device in a last MSE process before the first initial cell reselection times are obtained.

19. The terminal device according to claim 14, wherein the excluding N private network cells in the M private network cells from the MSE process comprises:
determining a third estimation period in a manner in which camping duration of the N private network cells is not counted into estimation duration corresponding to the MSE; and
performing the MSE based on a cell in the third estimation period.

20. The terminal device according to claim 14, wherein the target manner comprises performing the MSE based on the cell in the second estimation period, and the method further comprises:
determining the second estimation period based on the duration of the first estimation period and a duration offset, wherein
the duration of the second estimation period is a sum of the duration of the first estimation period and the duration offset, and the duration offset is related to at least one of a value of N and camping duration of the N private network cells.

* * * * *